Aug. 28, 1956  J. L. ROBERTSON  2,760,738
METHOD OF OPERATING A PROPELLER-DRIVEN AIRCRAFT
Filed April 13, 1953  2 Sheets-Sheet 1

INVENTOR.
JAMES L. ROBERTSON
BY Alfred W Petcheft
ATTORNEY

Aug. 28, 1956 J. L. ROBERTSON 2,760,738
METHOD OF OPERATING A PROPELLER-DRIVEN AIRCRAFT
Filed April 13, 1953 2 Sheets-Sheet 2

INVENTOR.
JAMES L. ROBERTSON
BY
*Alfred W. Petahaft*
ATTORNEY

United States Patent Office 2,760,738
Patented Aug. 28, 1956

2,760,738

METHOD OF OPERATING A PROPELLER-DRIVEN AIRCRAFT

James L. Robertson, Clayton, Mo., assignor, by mesne assignments, to The Frye Corporation, Fort Worth, Tex., a corporation of Texas Application April 13, 1953, Serial No. 348,264

1 Claim. (Cl. 244—65)

This invention relates in general to certain new and useful improvements in aircraft and, more particularly, to an auxiliary thrust system for aircraft.

In most types of heavier-than-air aircraft, a large percentage of accidents and crashes occur as a result of power failure during landing and as a result of related difficulties, making a so-called "dead-stick" landing necessary.

It is, therefore, the primary object of the present invention to provide an auxiliary thrust system which can be utilized to supply an additional amount of lift under circumstances of a dead-stick landing.

It is another object of the present invention to provide an auxiliary thrust system which is simple in construction and operation and employs substantially all of the existing components of the aircraft.

With the above and other objects in view, my invention resides in the novel features of form, construction, arrangement, and combination of parts presently described and pointed out in the claim.

In the accompanying drawings (two sheets)—

Figure 1:
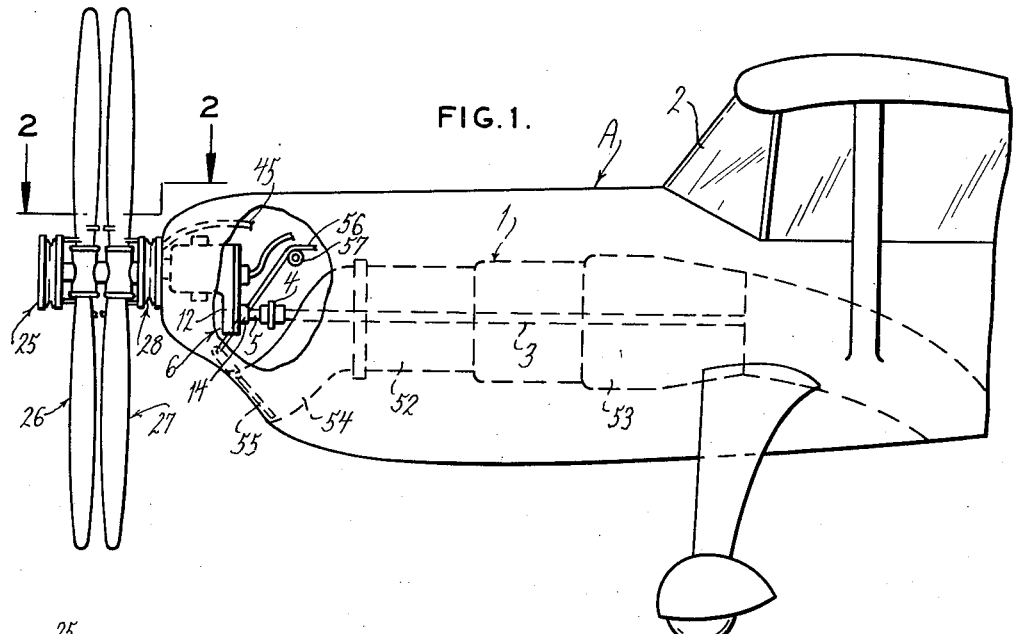
Figure 1 is a fragmentary side elevational view of an aircraft constructed in accordance with and embodying the present invention.

Referring now in more detail and by reference characters to the drawings, which illustrate practical embodiments of the present invention, A designates an aircraft fuselage preferably, though not necessarily, having a conventional gas turbine power plant 1 mounted forwardly of the cockpit 2 and having a forwardly extending drive shaft 3 which is connected through a coupling 4 to an input shaft 5 of a transmission unit 6 which, in turn, consists of a hollow housing 7 rigidly mounted in the nose of the fuselage A.

The housing 7 integrally includes an upper compartment or chamber 8 having forward, top, and bottom walls 9, 10, 11. Adjacent its rearward end, the chamber 8 is enlarged downwardly in the provision of a depending offset 12 and is provided with a cover plate 13 having a rearwardly extending bearing 14 for accommodating the input shaft 5. The upper portion of the wall is further provided with a rearwardly extending, relatively long, spindle-supporting boss 15 aligned concentrically with the chamber 8 and with a shaft bearing 16 formed in the forward wall 9. Rigidly mounted in and extending forwardly from the boss 15 is a stationary spindle 17 threaded at its rearward end for receiving a securement nut 18 and integrally provided with a diametrally enlarged shoulder 19 for tight seated engagement against a packing washer 20 fitted within a gland-forming recess 21.

Figure 3:
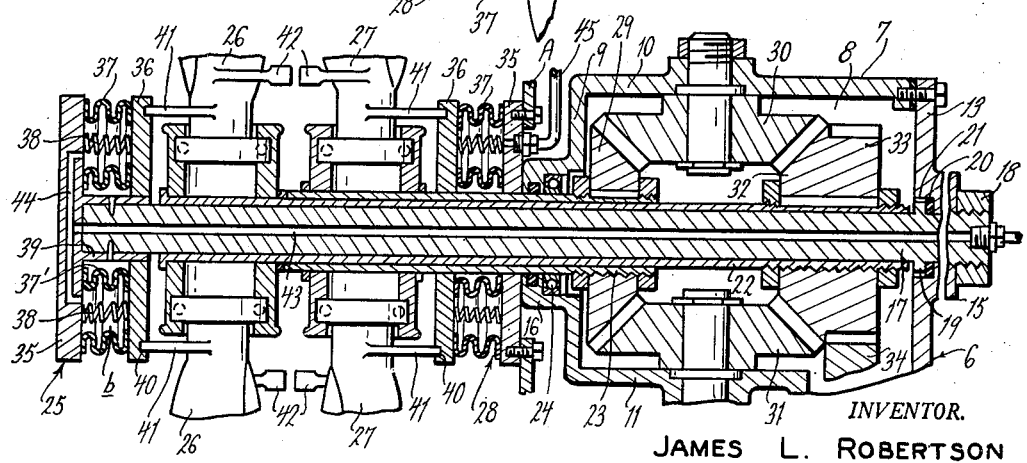
Figure 3 is a fragmentary sectional view taken along line 3—3 of Figure 2.
Figure 5:
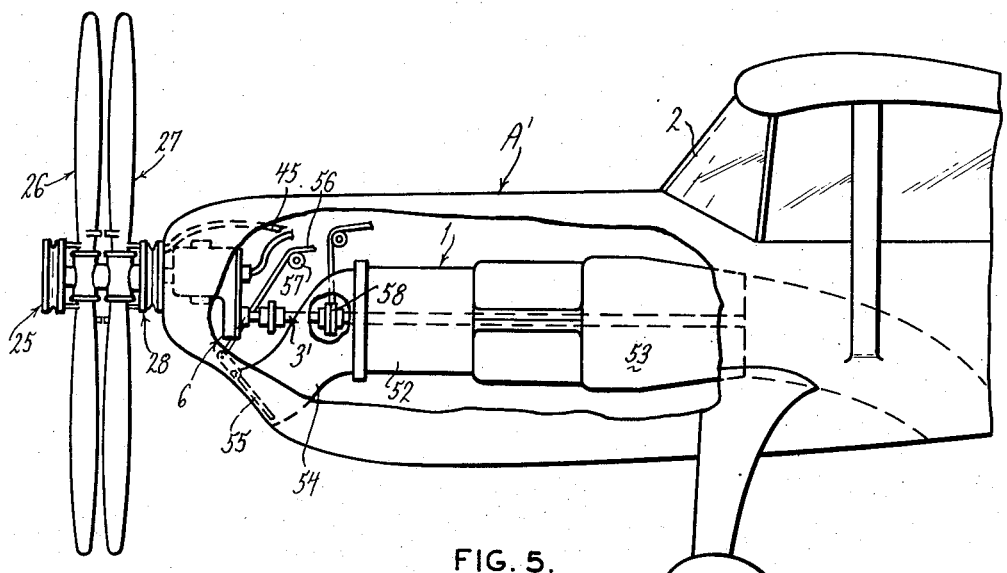
Figure 5 is a fragmentary side elevational view of a modified form of aircraft constructed in accordance with and embodying the present invention.
Figure 6:
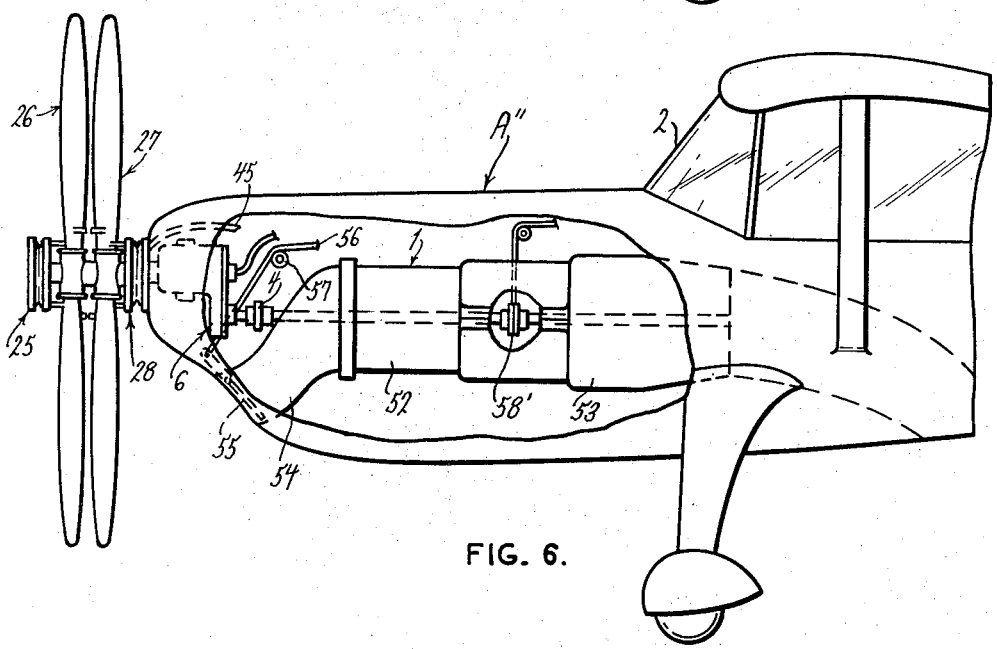
Figure 6 is a fragmentary side elevational view of a further modified form of aircraft constructed in accordance with and embodying the present invention.

Rotatably mounted upon the stationary spindle 17 are two respectively concentric and nested driving sleeves or tubular shafts 22, 23, which are respectively lubricated by oil with which the chamber 8 is substantially filled and are rotatably supported by a conventional ball bearing assembly 24 forming a part of the shaft bearing 16. The stationary spindle 17 and its associated tubular shafts 22, 23, extend forwardly through the bearing 16, substantially as shown in Figure 3, and at their outer ends are respectively provided with an outer pitch control unit 25, an outer adjustable witch propeller 26, and an inner adjustable pitch propeller 27.

Rigidly mounted upon the outer face of the front wall 9, concentrically about the outer tubular shaft 23, is an inner pitch control unit 28. Keyed to the interior end of the shaft 23 is a bevel gear 29 which meshes with planetary gears 30, 31, journaled respectively on the top and bottom walls 10, 11, and meshing, in turn, with a main bevel gear 32 keyed or otherwise rigidly mounted upon the shaft 22 and having a rearward spur gear portion 33 for meshing engagement with a spur gear 34 pinned or otherwise operatively mounted upon the inner end of the input shaft 5.

Each of the pitch control units 25, 28, include a stationary back-plate 35 and a moving or actuator plate 36 connected by concentrically mounted bellows 37, 37', forming a doughnut-shaped expansion chamber *b* annularly around the spindle 17. Operatively mounted with each chamber *b* between the back-plate 35 and actuator plate 36 is a plurality of internal tensioning springs 38 for normally biasing the actuator plate 36 in the direction of the stationary back-plate 35. As will be seen by reference to Figure 3, the back-plate 35 is integrally provided with an axially extending sleeve 39 upon which the moving plate 36 is shiftably supported. Furthermore, the moving or actuator plate 36 is provided in its outwardly presented face with an annular channel or groove 40 for rotatably receiving the inserted ends of rock arms 41, extending radially from the rotatable blades of the propellers 26, 27, respectively. It should be noted in this connection that the propellers 26, 27, are conventionally provided with counter-balancing weights 42 for offsetting the mass of the arms 41 so that the latter will not produce any dynamic imbalance when the propellers 26, 27, are rotating at high speed.

The outer pitch control unit 25 is supplied with hydraulic fluid through a duct 43 bored axially through the stationary spindle 17 and communicating to the chamber *b* through lateral ducts 44. Similarly, the inner pitch control unit 28 is provided with hydraulic fluid through a supply line 45 rigidly fixed in and extending through the back-plate 35 thereof and opening directly into the chamber *b* of such unit 28.

Figures 2, 4:
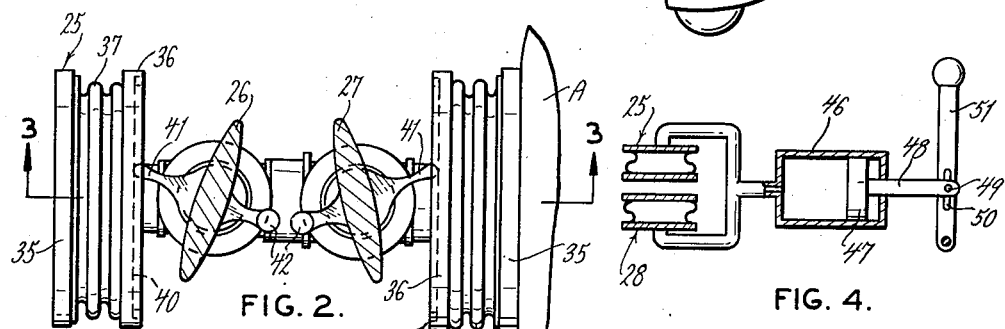
Figure 2 is a fragmentary sectional view taken along line 2—2 of Figure 1.
Figure 4 is a diagrammatic view of the hydraulic operating system forming a part of the present invention.

The pitch control units 25, 28, are operated by a control system diagrammatically shown in Figure 4 and comprising a pitch control cylinder 46 provided with a piston 47. Rigidly mounted at its inner end upon the piston 47 and extending outwardly therefrom is a piston rod 48 provided at its external end with a pin 49 operatively disposed in a slot 50 of a control lever 51 rockably mounted in a conventional manner within the cockpit 2.

The gas turbine power plant 1 conventionally consists of a compressor 52 and a turbine 53, both mounted concentrically on the main drive shaft 3. The compressor 52 is provided at its forward end with an air intake chute 54 which is controlled by a swinging gate-like throttle plate 55 operatively actuated by means of a cable 56 which also is conventionally trained over a series of pulleys 57 and extends into the cockpit 2.

During normal flight, the aircraft A is operated in the conventional manner and the pitch of the propellers 26, 27, may be adjusted by appropriate manipulation of the control lever 51. If the power plant 1 should fail and it should be necessary to make a forced landing, the propellers 26, 27, can be set to the smallest angle of pitch possible, so that the flow of air resulting from the forward speed of the aircraft A will produce maximum speed of rotation of the propellers. The aircraft A may be then set into a steep glide or dive so that the maximum speed can be obtained. The air rushing past the propellers 26, 27, will rotate them very rapidly. Since the power plant 1 is inoperative and its component elements are free to rotate as the propellers are rotated by the passage of air, the component parts of the power plant 1 will operate, in effect, as a fly wheel and considerable energy will be stored therein.

As the pilot approaches the ground and levels off for a landing, he may find that it is possible to land the aircraft A routinely without any need for auxiliary lift, in which case, conventional landing procedure will be employed. If, however, the pilot finds some obstruction, such as a high fence, a clump of trees, or a power transmission line, in his path and finds that his ordinary rate of descent will make it impossible for him normally to clear such object before reaching a clear landing area, it is possible to obtain a substantial amount of auxiliary thrust by actuating the control lever 51 to change the pitch of the propellers 26, 27, to the highest degree of pitch possible. The amount of energy stored in the rotating parts of the power plant 1 will force the propellers to continue rotative movement, but, by virtue of the change of pitch, the propellers will utilize this rotative energy to produce a forward and upward force on the aircraft quite similar to that which would be obtained if the power plant could be turned on again for a brief instant, thereby giving to the aircraft A an auxiliary amount of thrust which will cause it to glide upwardly as much as 75 ft. to 100 ft. at a fairly steep rate of climb after which it will glide downwardly again. This auxiliary thrust is ordinarily sufficient to clear ordinary obstacles and the availability of this auxiliary thrust when an emergency is encountered will eliminate a large percentage of accidents occurring during so-called "dead-stick" landings. This auxiliary thrust is also available for use during normal landing operations when a pilot finds, after having cut his engine, that he may land slightly short of the runway on the landing field.

It is also possible to provide a modified form of aircraft A' which is substantially identical in all respects to the previously described aircraft A except that a main drive shaft 3' is provided with a manually controllable clutch 58 which may be of any conventional design and is adapted to be operated from the cockpit. This type of application of this present invention is useful where the type of engine is such that it would act more as a brake on the propellers rather than as a fly wheel. Since the propellers themselves have substantial mass, it is possible, when necessary, to disengage the clutch 58 and set the pitch of the propellers so that they will be rotated at maximum speed during a steep glide or dive prior to landing. The propellers themselves will store a substantial quantity of energy and will provide an appreciable amount of auxiliary thrust when their pitch is changed during a landing approach.

Similarly, it is possible to provide a further modified form of aircraft A'' which is substantially identical in all respects to the previously described aircraft A and is provided with a manually controllable clutch 58' which is interposed between the compressor 52 and the turbine 53. Thus, it becomes possible to disconnect the turbine 53 and leave the compressor 52 to act as a fly wheel.

It should be understood that changes and modifications in the form, construction, arrangement, and combination of the several parts of the auxiliary thrust system for aircraft may be made and substituted for those herein shown and described without departing from the nature and principle of my invention.

Having thus described my invention, what I claim and desire to secure by Letters Patent is:

The method of creating a momentary high-lift thrust for emergency purposes in an aircraft having counter-rotating variable pitch propellers driven by a source of power through an optionally disconnectable clutch, said method comprising disconnecting the propellers, simultaneously setting the blades of the propellers at an angle of incidence capable of producing maximum rotational speed as a result of air flow past the propellers, setting the aircraft into a glide at a very sharp angle of descent to produce maximum air flow past said propellers whereby to store potential energy in the form of propeller inertia, restoring the aircraft to substantially level flight and, approximately coincident with restoration with level flight, resetting the propellers to maximum torque, whereby to produce auxiliary lift for a short period due to the potential energy stored therein.

References Cited in the file of this patent

UNITED STATES PATENTS

| | | |
|---|---|---|
| 2,076,090 | Myers | Apr. 6, 1937 |
| 2,380,889 | Waseige | July 31, 1945 |
| 2,423,183 | Forsyth | July 1, 1947 |
| 2,427,846 | Forsyth | Sept. 23, 1947 |
| 2,571,848 | Ehlers | Oct. 16, 1951 |
| 2,641,324 | Fortescue | June 9, 1953 |